(12) United States Patent
Hair, III et al.

(10) Patent No.: US 6,523,297 B1
(45) Date of Patent: Feb. 25, 2003

(54) FISHING LURE

(76) Inventors: James M. Hair, III, 7806 S. Milliron Rd., Cheyenne, WY (US) 82009-9393; Daniel L. Greene, 710 Golden Hill St., Cheyenne, WY (US) 82009

( * ) Notice: Subject to any disclaimer, the term of this patent is extended or adjusted under 35 U.S.C. 154(b) by 0 days.

(21) Appl. No.: 10/186,436

(22) Filed: Jul. 1, 2002

Related U.S. Application Data

(63) Continuation-in-part of application No. 09/842,462, filed on Apr. 26, 2001, now Pat. No. 6,427,375.

(51) Int. Cl.$^7$ ............................................. A01K 79/02
(52) U.S. Cl. ........................................................ 43/42.2
(58) Field of Search ..................... 43/17.1, 4, 42.19, 43/42.2, 42.31, 42.12, 42.14, 42.46

(56) References Cited

U.S. PATENT DOCUMENTS

| | | | | |
|---|---|---|---|---|
| 990,984 A | * | 5/1911 | Immell | 43/42.09 |
| 2,378,370 A | * | 6/1945 | Van Buren | 43/42.12 |
| 2,560,733 A | * | 7/1951 | Morris | 43/42.06 |
| 2,574,702 A | * | 11/1951 | Moulton | 43/42.12 |
| 2,788,603 A | * | 4/1957 | Lindemann | 43/26.2 |
| 2,977,705 A | * | 4/1961 | Rene-Guy | 116/67 R |
| 3,449,852 A | * | 6/1969 | Mitchell | 43/42.06 |
| 3,728,811 A | * | 4/1973 | Weimer | 43/26.2 |
| 3,973,349 A | * | 8/1976 | England | 43/4 |
| 4,139,964 A | * | 2/1979 | Pelletier | 43/42.19 |
| 6,427,375 B1 | * | 8/2002 | Hair, III et al. | 43/17.1 |

* cited by examiner

Primary Examiner—Thomas Price
(74) Attorney, Agent, or Firm—Loyal McKinley Hanson

(57) ABSTRACT

A fishing lure includes a shaft having a first end for connection to a line and a second end for connection to a hook. An outer body is provided on the shaft to conduct water through its hollow interior during retrieval while an inner body gating component rotatably mounted on the shaft within the hollow interior repetitively interrupts or gates the flow of water in a way that produces low frequency vibrations. As an angler retrieves a line attached to the shaft, water flows into an outer body input port, through the hollow interior, and then out a plurality of outer body output ports located at a rearward end of the outer body. The gating component rotates on the shaft in response to that flow of water at a rate of rotation dependent on the rate of retrieval, acting to interrupt the flow of water through the outer body output ports multiple times for each revolution in order to thereby produce low frequency vibrations having a frequency expressed in Hertz greater than the rate of rotation expressed in revolutions per second. A preferred gating component takes the form of an impeller-driven inner body through which the water must flow. Inner body output ports move into and out of alignment with outer body output ports as the inner body rotates, doing so multiple times for each revolution. According to another aspect of the invention, multiple vibration-making members (e.g., ball bearings) mounted within compartments in the inner body bear radially outward under influence of centrifugal force against a cylindrically shaped inner wall of the outer body, passing over multiple circumferentially spaced apart depressions in the inner wall for purposes of producing fish-luring vibrations.

9 Claims, 4 Drawing Sheets

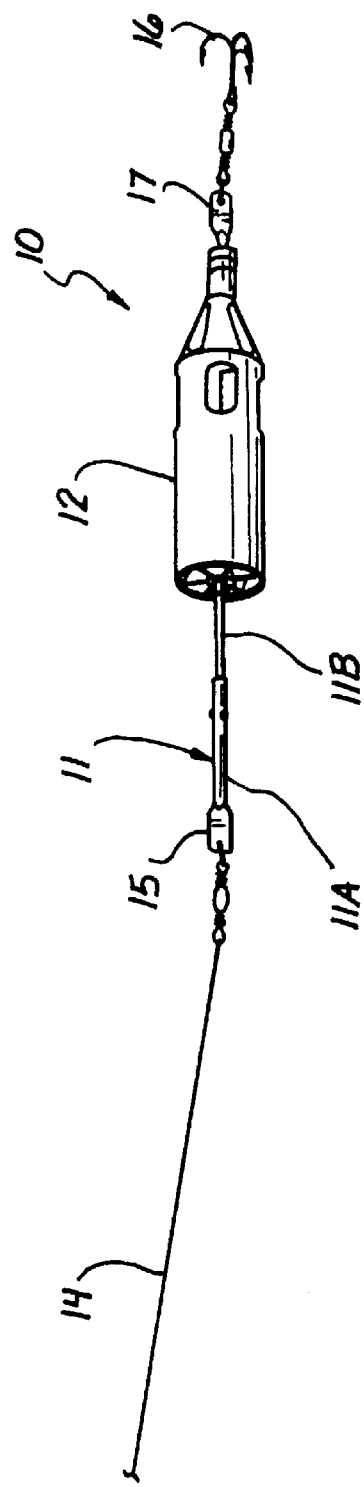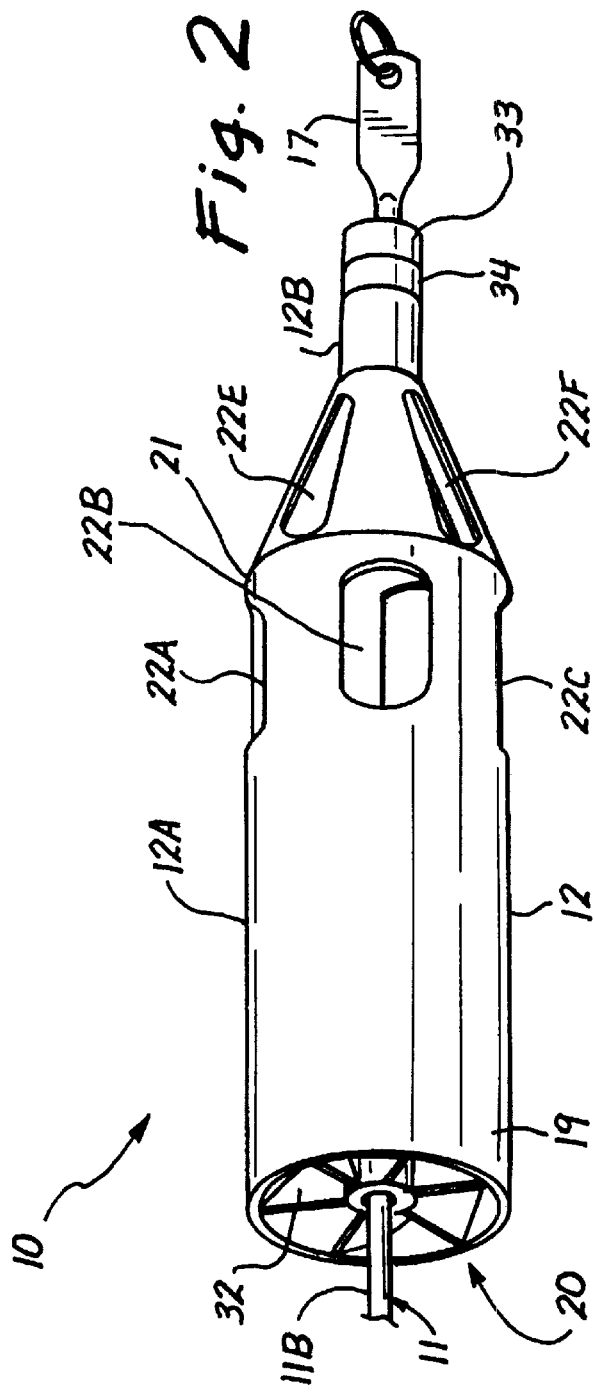

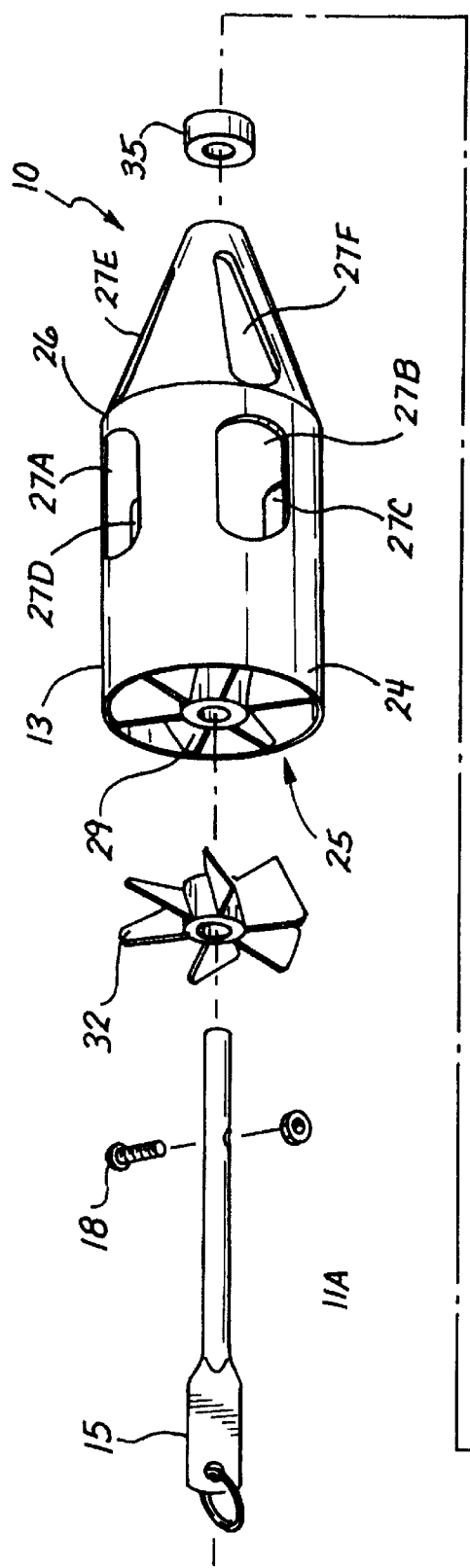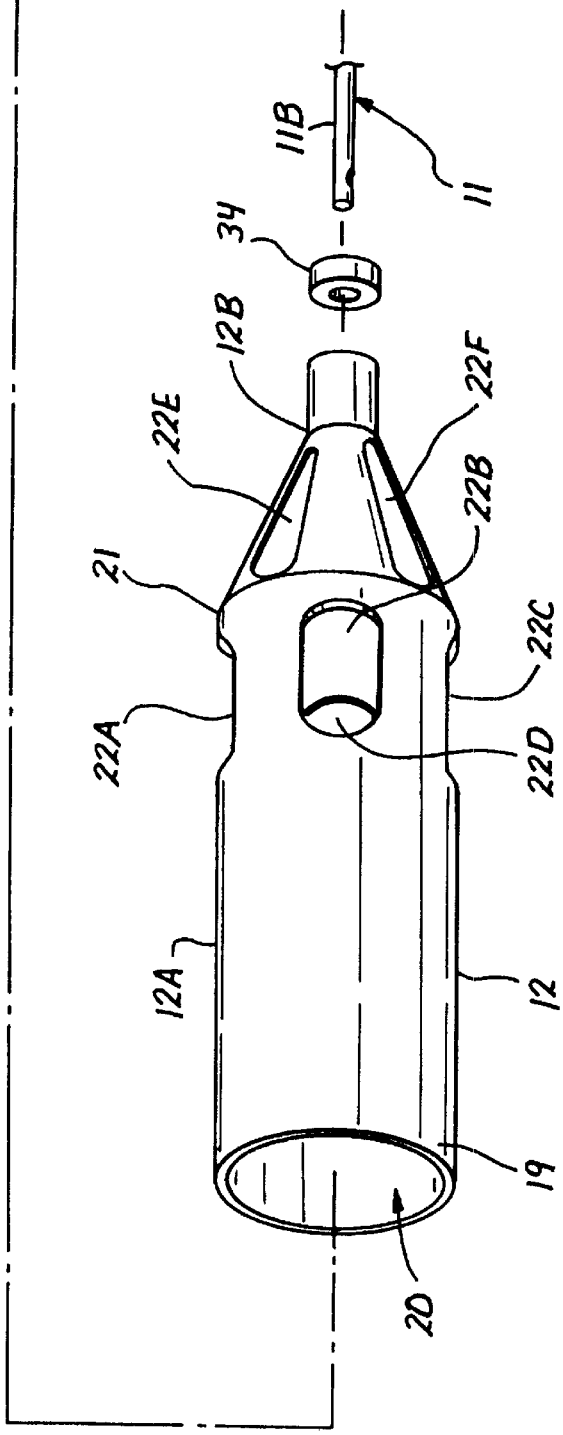
Fig. 3

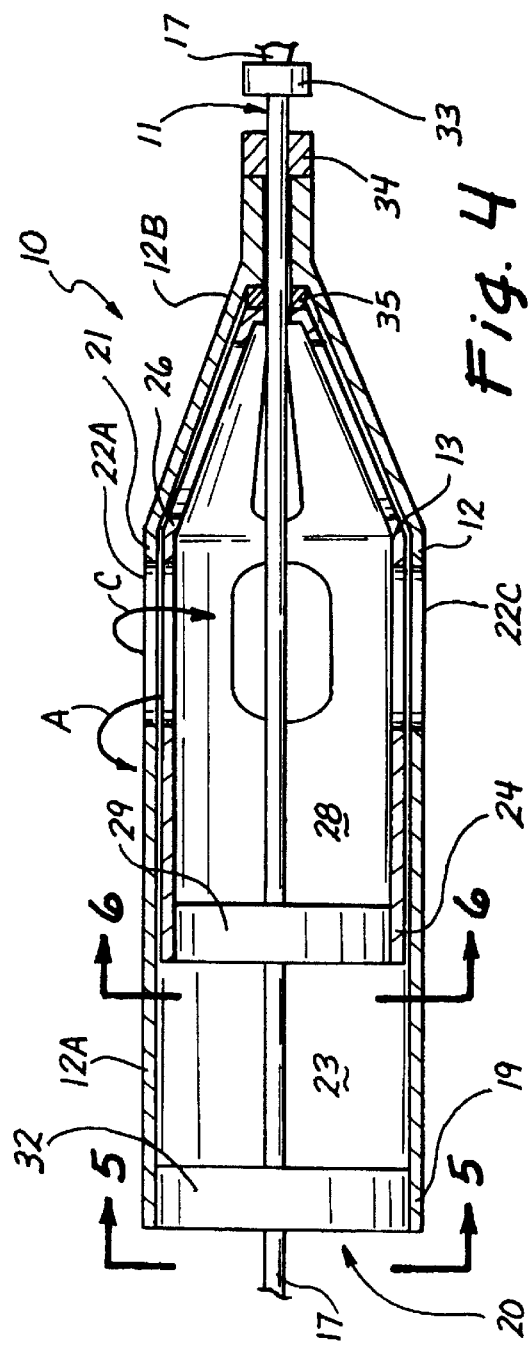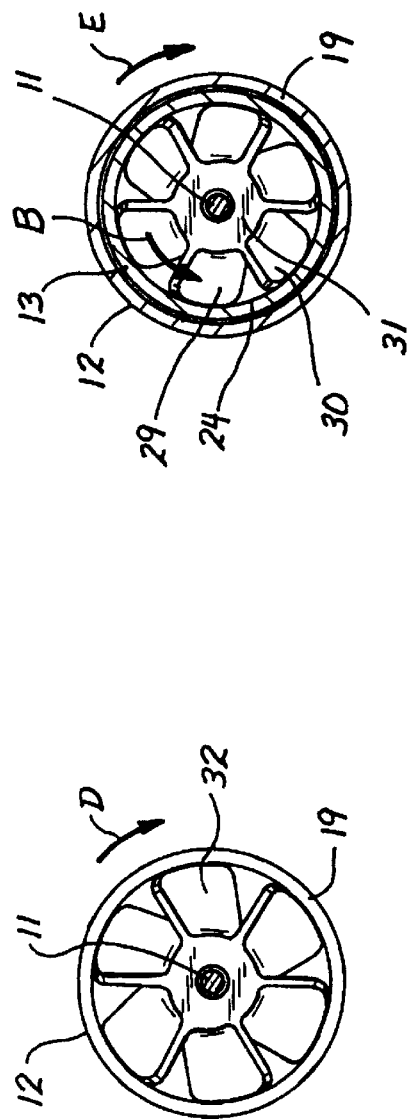
Fig. 4
Fig. 5
Fig. 6

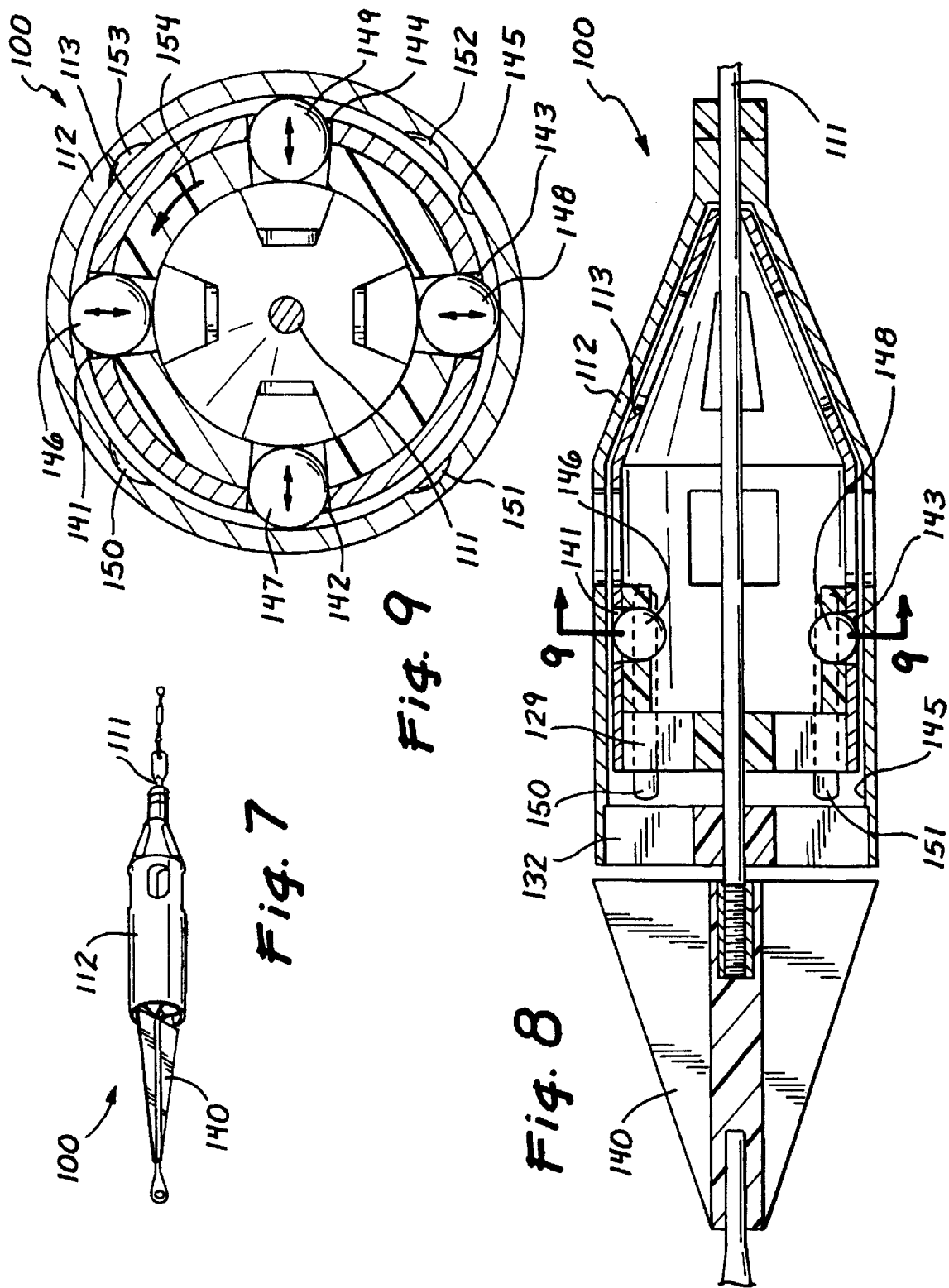

FISHING LURE

CROSS REFERENCE TO RELATED APPLICATION

This application is a continuation in part of U.S. Patent application Ser. No. 09/842,462 filed Apr. 26, 2000, now U.S. Pat. No. 6,427,375.

BACKGROUND OF THE INVENTION

1. Technical Field

This invention relates generally to fishing tackle, and more particularly to a sound-emitting fishing lure.

2. Description of Related Art

Predatory fish do not just locate prey optically. Their sight is limited. Even in reasonably clear water, the design of the average game fish's eyes does not let it see anything more than 20–30 feet away with any degree of clarity. For the majority of warm water lakes or silty rivers, the distance light travels may fall to near zero. This is, perhaps, the reason that the many spinning and crank baits try to utilize a "flash" of light to attract the attention of game fish in the belief that a flashing light carries farther and demands more attention than a stationary reflection surface.

Sound, however, does propagate well in water. Some predatory fish can detect low frequency vibrations produced by other fish at distances varying from immediate striking range to several hundred feet or more. But existing sound-emitting fishing lures have very limited success at effectively producing fish-attracting low frequency vibrations (e.g., 100 to 500 Hertz) within a small (e.g., less than six inches long) resonating chamber or generator. One, for example, uses a small bell mounted in-line upon the lure for resonance and it fails to produce a suitable frequency. Another uses complicated microelectronics fitted on the lure that are far too expensive. Nevertheless, low frequency vibrations are recognized as an effective way to attract fish, and so anglers need a better sound-emitting lure.

SUMMARY OF THE INVENTION

This invention addresses the concerns outlined above by providing a fishing lure that, as retrieved through water, uses the water itself to produce low frequency vibrations within the most effective hearing range of most game fish. The fishing lure includes outer and inner bodies mounted on a shaft. The outer body channels water through its hollow interior as it is retrieved, while the inner body rotates as a gating component that interrupts the flow intermittently to produce low frequency vibrations. This is done with a small (less than six inches long) sound generator, and it results in low frequency vibrations in the 100 to 500 Hertz range at realistic retrieval rates in the one foot-per-second to five feet-per-second range.

To paraphrase some of the more precise-language appearing in the claims, a fishing lure constructed according to the invention includes a shaft (e.g., 0.0625-inch diameter, six-inch long brass rod) having a first end portion adapted to be connected to a line and a second end portion adapted to be connected to a hook. An outer body mounted on the shaft includes a forward end portion that defines an outer body input port, a rearward end portion that defines a plurality of outer body output ports, and a hollow interior extending between the outer body input port and the plurality of outer body output ports. The outer body (e.g., a 0.75-inch diameter, three-inch long, thin-wall, plastic cylinder) is so adapted that as an angler retrieves the outer body through a body of water by pulling on a line connected to the shaft, water flows through the outer body input port into the hollow interior and then out of the hollow interior through the plurality of outer body output ports.

A gating component is included on the shaft that functions as means for repetitively interrupting the flow of water through the outer body output ports in order to produce low frequency vibrations. The gating component is mounted rotatably on the shaft within the hollow interior of the outer body for rotation on the shaft in response to water flowing through the hollow interior of the outer body. It rotates at a rate of rotation dependent on the rate at which the angler retrieves the outer body. The gating component is adapted to repetitively interrupt the flow of water through the plurality of outer body output ports multiple times for each revolution of the gating component in order to thereby produce low frequency vibrations having a frequency greater than the rate of rotation.

In one embodiment, the gating component includes an inner body (e.g., a two-inch long, thin-wall, plastic cylinder) that is mounted rotatably on the shaft within the hollow interior of the outer body. The inner body has a front end portion disposed toward the forward end portion of the outer body that defines an inner body input port, a rear end portion disposed toward the rearward end portion of the outer body that defines a plurality of inner body output ports, and a passageway extending between the inner body input port and the plurality of inner body output ports. An impeller on the front end portion of the inner body causes the inner body to rotate on the shaft in response to the flow of water through the inner body input port. The outer body and the inner body are so adapted as to cause water flowing through the hollow interior of the outer body to flow through the inner body input port past the impeller, through the passageway in the inner body, through inner body output ports, and then through the outer body output ports. In addition, the outer body and the inner body are adapted to cause at least some of the inner body output ports to move into and out of alignment with at least some of the outer body output ports multiple times for each revolution of the inner body on the shaft in order to thereby produce low frequency vibrations having a frequency greater than the rate of rotation of the inner body.

Preferably, the outer body includes a second impeller that is adapted to cause the outer body to rotate on the shaft in a second rotational direction opposite to the first rotational direction. Also, at least some of the plurality of outer body output ports preferably face radially outward at circumferentially spaced-apart intervals. The illustrated embodiment includes eight outer body output ports and the inner body includes eight inner body output ports in order to produce eight interruptions of the flow of water through the outer body output ports for each revolution of the inner body relative to the outer body.

According to another aspect of the invention, the outer body includes a cylindrically shaped inner wall that defines a plurality of circumferentially spaced apart, radially inward facing depressions, and the gating component defines a plurality of circumferentially spaced apart radially outward opening compartments. The gating component includes a plurality of vibration-making members (e.g., ball bearings) disposed within the radially outward opening compartments for radial movement toward and from the inner wall. Rotation of the gating component on the shaft causes the vibration-making members to bear radially outward against the inner wall of the outer body under influence of centrifugal force so that the vibration-making members produce vibrations for fish-luring purposes as the vibration-making members pass over the radially inward facing depressions.

Thus, the fishing lure of this invention is a small, relative uncomplicated and inexpensive, crank type bait that produces low frequency vibrations in the 100 to 500 Hertz range at realistic retrieval rates. The basic design (if fitted with a weedless hook) provides no fouling surfaces to underwater obstructions, making it virtually weedless. The design is scalable to lengths from three to eighteen inches or more so that it can be fine-tuned to be effective in both fresh and salt water. It can even be configured especially for trolling for deep sea or big-game fishing, and the added vibration-making members produce effective fish-luring vibrations. The following illustrative drawings and detailed description make the foregoing and other objects, features, and advantages of the invention more apparent.

BRIEF DESCRIPTION OF THE DRAWINGS

FIG. 1 of the drawings is an isometric view of a fishing lure constructed according to the invention, shown with a line and a treble hook attached;

FIG. 2 is an enlarged isometric view of just the fishing lure with a forward end portion of the shaft omitted for illustrative convenience;

FIG. 3 is a disassembled view of the fishing lure;

FIG. 4 is an enlarged cross sectional view of the fishing lure as viewed in a vertical plane containing the longitudinal axis of the shaft;

FIG. 5 is a forward end view of the fishing lure taken in a transverse plane containing a line 5—5 of FIG. 4 to show the outer body impeller driving the outer body;

FIG. 6 is a cross sectional view taken in a transverse plane containing a line 6—6 in FIG. 4 to show the inner body impeller driving the inner body;

FIG. 7 is an isometric view of a second embodiment of a fishing lure constructed according to the invention;

FIG. 8 is an enlarged cross sectional view as viewed in a plane containing the longitudinal axis of the shaft; and FIG. 9 is a cross sectional view taken in a transverse plane containing a line 9—9 in FIG. 8 to show grooves that the balls pass over to produce fish-luring vibrations.

DESCRIPTION OF THE PREFERRED EMBODIMENTS

FIGS. 1–6 of the drawings show various aspects of a fishing lure 10 constructed according to the invention. Generally, the fishing lure 10 includes a shaft 11 (FIGS. 1–6) on which is mounted an outer body 12 (FIGS. 1–6) and an inner body 13 (FIGS. 3, 4, and 6). It is shown in a operative position in FIG. 1, with a fishing line 14 attached by suitable means (e.g., a split ring and swivel) to a first end portion 15 of the shaft 11, and a treble hook 16 attached by suitable means to a second end portion 17 of the shaft 11. An angler reels in the line 14 to retrieve the fishing lure 10, and that causes water to flow through the outer and inner bodies 12 and 13 in a manner subsequently described to produce low frequency vibrations in the range of 100 Hertz to 500 Hertz depending on the rate of retrieval.

The shaft 11 may take any of various forms. It provides a rigid backbone for the fishing lure 10 on which the other components are mounted. The illustrated shaft 11 is a six-inch long assembly having a front end component 11A mounted on a rear end component 11B with a nut-and-bolt combination 18 as shown in FIG. 3. The front and rear end components 11A and 11B are fabricated from lengths of brass stock measuring on the order of about 1/16" in diameter so that the front end component 11A includes the previously mentioned first end portion 15 of the shaft 11 that is adapted to be connected to the line 11 (e.g., it is flattened and provided with a opening), and so that the rear end component 11B includes the previously mentioned second end portion 17 of the shaft 11 that is adapted to be connected to the hook 16 (e.g., it is also flattened and provided with a opening). Of course, other materials and dimensions may be used without departing from the broader inventive concepts disclosed.

The outer body 12 may also take any of various forms in order to function as a conduit for water during retrieval. The illustrated outer body 12 is a cylindrically shaped, three-inch long assembly. It includes a front end component 12A formed from a two-inch long length of 0.75-inch diameter, thin-wall plastic tubing, and a conically shaped rear end component 12B that is a one-inch long length of similar material bonded or otherwise suitably attached to the front end component 12A (FIGS. 2 and 3). Of course, those components can be molded in unitary one-piece construction. They are so configured that the outer body 12 includes a forward end portion 19 (FIGS. 2–5) that defines an outer body input port 20 (FIGS. 2–4), a rearward end portion 21 (FIGS. 2–4) that defines a plurality of eight outer body output ports of which only the six ports 22A–22F are designated in the drawings (FIGS. 2–4), and a hollow interior 23 (FIG. 4) extending between the outer body input port 20 and the plurality of outer body output ports 22A–22F. Configured that way, the outer body 12 is so adapted that as the angler retrieves it through a body of water by reeling in the fishing line 14, water flows through the outer body input port 20 into the hollow interior 23 and then back out of the hollow interior 23 through the plurality of outer body output ports 22A–22F.

The inner body 13 acts as a gating component that functions as means for repetitively interrupting or gating the flow of water through the outer body output ports 22A–22F in order to produce pulsations and associated low frequency vibrations. To function as such a gating component, the inner body 13 is mounted rotatably on the shaft 11 within the hollow interior 23 of the outer body 12 for rotation on the shaft 11 in response to water flowing through the hollow interior 23 of the outer body 12 at a rate of rotation dependent on the rate at which the angler retrieves the outer body 12. As such a gating component, the inner body 13 is adapted to repetitively interrupt the flow of water through the plurality of outer body output ports 22A–22F multiple times for each revolution of the inner body 13 in order to thereby produce low frequency vibrations having a frequency (expressed in Hertz) greater than the rate of rotation (expressed in revolutions per second).

The inner body 13 is a length of thin-wall tubing mounted rotatably on the shaft 11 within the hollow interior 23 of the outer body 12, and it has an outside diameter just slightly smaller than the inside diameter of the outer body 12 so that it can rotate freely. The inner body 13 has a front end portion 24 (FIGS. 3 and 4) disposed toward the forward end portion 19 of the outer body 12 that defines an inner body input port 25 (FIG. 3). The inner body 13 also has a rear end portion 26 (FIGS. 3 and 4) disposed toward the rearward end portion 21 of the outer body 12 that defines a plurality of eight inner body output ports of which only the six ports 27A–27F are designated in the drawings. The inner body 13 defines a passageway 28 (FIG. 4) extending between the inner body input port 25 and the plurality of inner body output ports 27A–27F such that water flowing through the hollow interior 23 of the outer body 12 flows through the passageway 28 from the inner body input port 25 to the inner body output ports 27A–27F.

An impeller 29 is included on the front end portion 24 of the inner body 13, mounted rotatably on the shaft 11. It is also sometimes referred to as a turbine wheel. It has a series of curved vanes, such as the curved vane 30 in FIG. 6, that are held by a central rotating spindle 31. Water flowing through the hollow interior 23 of the outer body 12 and the inner body input port 25 into the passageway 28, flows past the impeller 29, thereby causing the impeller 29 to rotate on the shaft 11. In so doing, the impeller 29 functions as means responsive to the flow of water through the inner body input port 25 for causing the inner body 13 to rotate on the shaft 11. The impeller 29 may be bonded or otherwise suitably attached to the inner body within the inner body input port 25 for that purpose, including being held in place by tight-fitting engagement of the inner body 13 (i.e., a press fit).

Thus, the outer body 12 and the inner body 13 are adapted to cause water flowing through the hollow interior 23 of the outer body 12 to flow through the inner body input port 25, past the impeller 29, through the passageway 28 in the inner body 13, through inner body output ports 27A–27F, and then through outer body output ports 22A–22F. That causes the inner body 13 to rotate. In addition, the outer body 12 and the inner body 13 are adapted to cause at least some of the inner body output ports 27A–27F to move into and out of alignment with at least some of the outer body output ports 22A–22F multiple times for each revolution of the inner body 13 on the shaft 11 in order to repetitively interrupt the flow of water. Doing so produces low frequency vibrations having a frequency greater than the rate of rotation of the inner body 13.

Any of various output port configurations may be used to repetitively interrupt or gate the flow of water. The four outer body output ports 22A–22D designated in FIG. 3 face radially outward at uniformly spaced-apart, ninety-degree intervals around the circumference of the outer body 12 (i.e., at 90, 180, 270, and 360 degree positions). Similarly, the four inner body output ports 27A–27D (FIG. 3) face radially outward at uniformly spaced-apart, ninety-degree intervals positions on the circumference of the inner body 13 (i.e., at 90, 180, 270, and 360 degree positions). That arrangement produces four interruptions per revolution of the inner body 13 relative to the outer body 12 as the outer body output ports 22A–22D move into and out of alignment with the inner body output ports 27A–27D four times per revolution.

The frequency is increased for a given retrieval rate and corresponding rate of rotation, by four staggered outer body output ports, of which only the two staggered outer body output ports 22E and 22F are designated in FIGS. 2 and 3. They face radially outward on an incline at uniformly spaced-apart ninety degree intervals that are staggered relative to the intervals for the outer body output ports 22A–22D (i.e., they are at 45, 135, 125, and 315 degree positions). The corresponding four inner body output ports face radially outward on an incline at uniformly spaced-apart ninety degree intervals that are not staggered. They are at 90, 180, 270, and 360 degree positions on the circumference of the inner body 13, only the corresponding inner body output ports 27E and 27F being designated in FIG. 3. That staggered arrangement produces an additional four interruptions for each revolution of the inner body 12 relative to the outer body 13.

Preferably, the outer body 12 includes a second impeller 32 (FIGS. 2–5) that is generally similar to the first impeller 29. It is mounted rotatably on the shaft 11 within the outer body input port 20 where it is attached to the first end portion 19 of the outer body 12 by bonding, tight-fitting engagement, or other suitable means. It produces counter-rotation that increases the relative rate of rotation of the inner body 13 relative to the outer body 12. It also serves to provide some outer body movement as added attraction to a fish that has moved in close to within visual range of the fishing lure 10.

The first impeller 29 is adapted to cause the inner body 13 to rotate on the shaft 11 in a first rotational direction as depicted by an arrow A in FIG. 4 (e.g., counterclockwise as viewed from the line 6—6 and indicated by an arrow B in FIG. 6). The second impeller 32 is adapted to cause the outer body 12 to rotate on the shaft 11 in a second rotational direction opposite to the first rotational direction as depicted by an arrow C in FIG. 4, an arrow D in FIG. 5, and an arrow D in FIG. 6 (i.e., clockwise). Water flowing through the outer body input port 25, flows past the second impeller 32 and that causes the second impeller 32 to rotate on the shaft 11, counter to the inner body 13.

In addition to the components described above, the fishing lure 10 includes a brass collar 33 (FIGS. 2 and 4) that provides a bearing surface for a first bearing 34 (e.g., Teflon) visible in FIGS. 2–4. A similar second bearing 35 (FIG. 4) is disposed on the shaft 11 between the rearward end portion of the outer body 12 and the rear end portion of the inner body 13. The angler can readily disassemble all these components for cleaning purposes by removing the nut-and-bolt combination 18.

After a cast into water, the act of retrieving the fishing lure 10 forces water through the outer body input port 25 into the fishing lure 10. Water pressure upon the impeller 29 causes it to spin a rate of rotation dependent on the rate of retrieval. This in turn causes intermittent interruptions in the flow of water through the fishing lure 10, and the resulting water pulsations produce the desired low frequency vibrations. A slow retrieve in the range of one to two feet-per-second results in a frequency of about 100–150 Hertz. A medium retrieve in the range of two to three feet-per-second results in a frequency of about 150–250 Hertz, and a fast retrieve in the range of three to five feet-per-second results in a frequency greater than 250 Hertz. All of these frequencies fall well within the perceptible range of the majority of game fish.

Turning now to FIGS. 7–9, they show a second embodiment of the invention in the form of a fishing lure 100. It is similar in many respects to the fishing lure 10 and so only differences are described in further detail. For convenience, reference numerals designating parts of the fishing lure 100 are increased by one hundred over those designating similar, related, or corresponding parts of the fishing lure 10.

Similar to the fishing lure 10, the fishing lure 100 includes a shaft 111 (FIGS. 7–9) on which is mounted an outer body 112 and an inner body 113 (FIGS. 8, and 9). By operation of the angler reeling in the fishing lure 100, water flows through the outer and inner bodies 112 and 113, past impellers 129 and 132 (FIG. 8), in a manner described previously for the fishing lure 10 to cause rotation and produce low frequency vibrations. A forwardly disposed, cone-shaped component 140 adds streamlining that improves stability.

Unlike the fishing lure 10, the inner body 113 of the fishing lure 100 (including the impeller 129 portion of the inner body 113) defines a plurality of (e.g., four) circumferentially spaced apart compartments 141, 142, 143, and 144 (FIGS. 8 and 9). The four compartments 141–144 open radially outward toward a cylindrically shaped inner wall 145 of the outer body 112. A plurality of (e.g., four) free-floating, radially moveable members referred to herein as vibration-making members 146, 147, 148, and 149 (e.g., ball bearings) are disposed within the compartments 141–144 where they bear radially outward against the inner wall 145 under influence of centrifugal force when the inner body 113 rotates. The compartments 141–144 are sized and shaped so that the vibration-making members 146–149 cannot escape radially inward from the compartments 141–144 toward the shaft 111.

The inner wall 145 of the outer body 112 defines a plurality of (e.g., four) circumferentially spaced apart indentations 150, 151, 152, and 153. All four indentations 150–153 are visible in FIG. 9 while just two indentations 150 and 151 are visible in FIG. 8. The indentations 150–153 may take the form of shallow grooves that extend parallel to the shaft 111 as illustrated for the indentations 150 and 151 in FIG. 8. As the inner body 113 rotates (arrow 154 in FIG. 9) and the vibration-making members bear against the inner wall 145 of the outer body 112, the vibration-making members 146–149 move radially toward and away from the indentations 150–153 as depicted by double-headed arrows in FIG. 9. They move radially back and forth, and that produces fish-luring vibrations (i.e., vibrations that attract the attention of fish).

Thus, the invention provides a fishing lure that uses the water itself to produce low frequency vibrations within the most effective hearing range of most game fish, both by gating the flow of water through the lure and by powering the action of vibration-making members moving across indentations in the inner wall of the outer body. It is a small, relative uncomplicated and inexpensive, crank type bait that produces low frequency vibrations in the 100 to 500 Hertz range at realistic retrieval rates. The basic design (if fitted with a weedless hook) provides no fouling surfaces to underwater obstructions, making it virtually weedless. The design is scalable to lengths from three to eighteen inches or more so that it can be fine-tuned to be effective in both fresh and salt water, and it can even be configured especially for trolling for deep sea or big-game fishing. Although an exemplary embodiment has been shown and described, one of ordinary skill in the art may make many changes, modifications, and substitutions without necessarily departing from the spirit and scope of the invention.

What is claimed is:

1. A fishing lure, comprising:
    a shaft having a first end portion adapted to be connected to a line and a second end portion adapted to be connected to a hook;
    an outer body mounted on the shaft, the outer body having a hollow interior; and
    an inner body mounted rotatably on the shaft within the hollow interior of the outer body for rotation on the shaft in response to water flowing through the hollow interior of the outer body;
    wherein the outer body includes a cylindrically shaped inner wall that defines a plurality of circumferentially spaced apart, radially inward facing depressions;
    wherein the inner body defines a plurality of circumferentially spaced apart radially outward opening compartments; and
    wherein the inner body includes a plurality of vibration-making members disposed within the radially outward opening compartments for radial movement toward and away from the inner wall;
    whereby rotation of the inner body on the shaft causes the vibration-making members to bear radially outward against the inner wall of the outer body under influence of centrifugal force so that the vibration-making members produce vibrations for fish-luring purposes as the vibration-making members pass over the radially inward facing depressions.

2. A fishing lure, comprising:
    a shaft having a first end portion adapted to be connected to a line and a second end portion adapted to be connected to a hook;
    an outer body mounted on the shaft, the outer body having a forward end portion that defines an outer body input port, a rearward end portion that defines a plurality of outer body output ports, and a hollow interior extending between the outer body input port and the plurality of outer body output ports, the outer body being so adapted that as an angler retrieves the outer body through a body of water, water flows through the outer body input port into the hollow interior and then out of the hollow interior through the plurality of outer body output ports;
    a gating component adapted to function as means for repetitively interrupting the flow of water through the outer body output ports in order to produce low frequency vibrations, the gating component being mounted rotatably on the shaft within the hollow interior of the outer body for rotation on the shaft in response to water flowing through the hollow interior of the outer body at a rate of rotation dependent on the rate at which the angler retrieves the outer body, and the gating component being adapted to repetitively interrupt the flow of water through the plurality of outer body output ports multiple times for each revolution of the gating component in order to thereby produce low frequency vibrations having a frequency greater than the rate of rotation;
    wherein the outer body includes a cylindrically shaped inner wall that defines a plurality of circumferentially spaced apart, radially inward facing depressions;
    wherein the gating component defines a plurality of circumferentially spaced apart radially outward opening compartments; and
    wherein the gating component includes a plurality of vibration-making members disposed within the radially outward opening compartments for radial movement toward and from the inner wall;
    whereby rotation of the gating component on the shaft causes the vibration-making members to bear radially outward against the inner wall of the outer body under influence of centrifugal force so that the vibration-making members produce vibrations for fish-luring purposes as the vibration-making members pass over the radially inward facing depressions.

3. A fishing lure as recited in claim 2, wherein;
    the plurality of depressions includes four circumferentially spaced apart, axially extending grooves; and
    the plurality of vibration-making members includes four ball bearings.

4. A fishing lure as recited in claim 2, wherein the gating component includes:
    an inner body mounted rotatably on the shaft within the hollow interior of the outer body, the inner body having a front end portion disposed toward the forward end portion of the outer body that defines an inner body input port, a rear end portion disposed toward the rearward end portion of the outer body that defines a plurality of inner body output ports, and a passageway extending between the inner body input port and the plurality of inner body output ports; and an impeller on the front end portion of the inner body that functions as means responsive to the flow of water through the inner body input port for causing the inner body to rotate on the shaft;

wherein the outer body and the inner body are adapted to cause water flowing through the hollow interior of the outer body to flow through the inner body input port past the impeller, through the passageway in the inner body, through inner body output ports, and then through outer body output ports; and wherein the outer body and the inner body are adapted to cause at least some of the inner body output ports to move into and out of alignment with at least some of the outer body output ports multiple times for each revolution of the inner body on the shaft in order to thereby produce low frequency vibrations having a frequency greater than the rate of rotation of the inner body.

5. A fishing lure as recited in claim 4, wherein the impeller is adapted to cause the inner body to rotate on the shaft in a first rotational direction, and the outer body includes a second impeller that is adapted to cause the outer body to rotate on the shaft in a second rotational direction opposite to the first rotational direction.

6. A fishing lure as recited in claim 2, wherein at least some of the plurality of outer body output ports face radially outward at circumferentially spaced-apart intervals.

7. A fishing lure as recited in claim 2, wherein the outer body includes eight outer body output ports and the inner body includes eight inner body output ports in order to produce eight interruptions of the flow of water through the outer body output ports for each revolution of the inner body relative to the outer body.

8. A fishing lure, comprising:

a shaft having a first end portion adapted to be connected to a line and a second end portion adapted to be connected to a hook;

an outer body mounted on the shaft, the outer body having a forward end portion that defines an outer body input port, a rearward end portion that defines a plurality of outer body output ports, and a hollow interior extending between the outer body input port and the plurality of outer body output ports, the outer body being so adapted that as a user pulls the outer body through a body of water by pulling on the first end portion of the shaft, water flows through the outer body input port into the hollow interior and then out of the hollow interior through the plurality of outer body output ports;

an inner body rotatably mounted on the shaft within the hollow interior of the outer body that is adapted to function as means for repetitively interrupting the flow of water through the plurality of outer body output ports in order to thereby produce low frequency vibrations, the inner body having a front end portion disposed toward the forward end portion of the outer body that defines an inner body input port, a rear end portion disposed toward the rearward end portion of the outer body that defines a plurality of inner body output ports, and a passageway extending between the inner body input port and the plurality of inner body output ports; and an impeller on the front end portion of the inner body that functions as means responsive to the flow of water through the inner body input port for causing the inner body to rotate on the shaft at a rate of rotation dependent on the rate at which an angler retrieves the outer body;

wherein the outer body and the inner body are adapted to cause water flowing through the hollow interior of the outer body to flow through the inner body input port past the impeller, through the passageway in the inner body, through the plurality of inner body output ports, and then through the plurality of outer body output ports;

wherein the outer body and the inner body are adapted to cause the at least some of inner body output ports to move into and out of alignment with at least some of outer body output ports multiple times for each revolution of the inner body on the shaft in order to thereby produce low frequency vibrations having a frequency greater than the rate of rotation of the inner body;

wherein the outer body includes a cylindrically shaped inner wall that defines a plurality of circumferentially spaced apart, radially inward facing depressions;

wherein the gating component defines a plurality of circumferentially spaced apart radially outward opening compartments; and wherein the gating component includes a plurality of vibration-making members disposed within the radially outward opening compartments for radial movement toward and from the inner wall;

whereby rotation of the gating component on the shaft causes the vibration-making members to bear radially outward against the inner wall of the outer body under influence of centrifugal force so that the vibration-making members produce vibrations for fish-luring purposes as the vibration-making members pass over the radially inward facing depressions.

9. A fishing lure as recited in claim 8, wherein the impeller is adapted to cause the inner body to rotate on the shaft in a first rotational direction, and the outer body includes a second impeller that is adapted to cause the outer body to rotate on the shaft in a second rotational direction opposite to the first rotational direction.

* * * * *